United States Patent [19]

Breithaupt

[11] 4,222,074
[45] Sep. 9, 1980

[54] HORIZONTAL SYNCHRONIZING SYSTEM

[75] Inventor: David W. Breithaupt, Maple Shade, N.J.

[73] Assignee: RCA Corporation, New York, N.Y.

[21] Appl. No.: 952,221

[22] Filed: Oct. 6, 1978

[30] Foreign Application Priority Data

Apr. 10, 1978 [GB] United Kingdom ............... 13898/78

[51] Int. Cl.² ............................................. H04N 5/04
[52] U.S. Cl. .................................. 358/149; 358/148; 358/150; 358/158
[58] Field of Search ................ 358/149, 150, 148, 158

[56] References Cited

U.S. PATENT DOCUMENTS

| 3,311,702 | 3/1967 | Legler | 358/149 |
|---|---|---|---|
| 3,336,440 | 8/1967 | Blake et al. | 358/158 |
| 3,413,414 | 11/1968 | Baldwin et al. | 358/149 |
| 3,420,951 | 1/1969 | Gunther | 358/149 |
| 3,429,994 | 2/1969 | Pay et al. | 358/149 |
| 3,655,913 | 4/1972 | Schneider | 358/149 |
| 3,790,710 | 2/1974 | Gaucheron | 358/149 |
| 4,038,683 | 7/1977 | Thorpe et al. | 358/19 |
| 4,144,545 | 3/1979 | Fernsler et al. | 358/158 |

Primary Examiner—Richard Murray
Attorney, Agent, or Firm—Eugene M. Whitacre; Paul J. Rasmussen; Robert L. Troike

[57] ABSTRACT

A horizontal synchronizing signal from a reference source is sampled at the vertical rate by a first sampling gate controlled by a vertical rate signal from a reference source. A signal related to the output of a horizontal frequency synchronizing pulse generator is sampled at the vertical rate by a second sampling gate controlled by the vertical rate signal. The output of each sampling gate is fed to an input of a phase detector which develops an error signal indicative of the phase relationship between the two sampled signals. The error signal is utilized to control the phase of the generated horizontal synchronizing pulse.

5 Claims, 7 Drawing Figures

HORIZONTAL SYNCHRONIZING SYSTEM

BACKGROUND OF THE INVENTION

This invention relates to a circuit for synchronizing the horizontal frequency synchronizing pulse generator in a television camera system to a reference signal.

In television camera systems, it is necessary that the output of video signal be synchronized with an external reference so that the signals from various sources can be combined. A television camera typically consists of a camera head and a camera control unit. The camera head includes the precision optical mounts and mechanical assemblies, the image pickup tubes, and appropriate electronics to scan the image and produce video signals representative of the image. The control unit includes the electronics to process and encode the video signals produced by the camera head. The camera head and camera control unit are often interconnected by a cable of unknown length. This length may vary, for example, from 100 feet to as much as 2,000 feet. The phase delays introduced by this cable must be compensated for in order to achieve the desired horizontal synchronization.

In the past, the phase delay introduced by the cable has been compensated for by comparing the horizontal reference signal with the horizontal synchronization pulses received at the control unit from the camera head. The output of this comparator is a signal which is indicative of the phase error between the two horizontal synchronizing pulses. This signal is then utilized to control an oscillator or to control a controllable variable delay device situated in the control unit. This control loop will then automatically compensate for the phase delay of the cable.

It is also known to compare the vertical synchronizing pulse from the camera head with the vertical synchronizing signal to correct for errors in vertical synchronization, in a manner similar to that described above. Another previous technique employs an oscillator operating at 31.5 kilohertz, or twice the horizontal frequency. The output of this oscillator is divided by two to provide a 15.75 kilohertz horizontal synchronizing signal. The output of the oscillator is also divided by 525 to provide a 60 hertz vertical rate signal. This vertical rate signal is then compared with the 60 hertz power line frequency to develop a phase error signal. This phase error signal is utilized to control the 31.5 kilohertz oscillator to synchronize the system.

The cables utilized to interconnect the camera head and the control unit also introduces undesirable attenuation of the higher frequency signals transmitted along the cable. In order to assure a useful signal at the control unit end of the cable, the video signal transmitted from the camera head may utilize the maximum peak voltage of each polarity to represent black and white, respectively. A signal which alternates between the black and the white voltage levels may be inserted into the horizontal blanking interval for use by an equalizer circuit in order to compensate for this high frequency roll-off. It is desirable that the horizontal synchronizing pulse generator be locked in phase with the reference signal prior to the operation of the equalizer circuit so that the horizontal synchronizing pulse can be utilized to sample the inserted signal. It has been determined that it is also desirable that the horizontal oscillator phase control circuit utilize the same inserted signal as the equalizer circuit in order to avoid the necessity of inserting two signals into each horizontal blanking interval and the subsequent decoding problems. As a result of the fact that this inserted signal is of the same amplitude of the video signal and within the same frequency spectrum, the signal must be sampled during a period in which no video signal is present. It is desirable that no video signal be present before and after the inserted signal, in order to avoid an erroneous control signal. This criterion cannot be met by a system which samples during the horizontal blanking intervals.

SUMMARY OF THE INVENTION

In accordance with an embodiment of the present invention, a phase control circuit for the horizontal frequency synchronizing pulse generator in a television camera system comprises a first sampling gate controlled by a vertical rate signal for sampling a horizontal reference signal at the vertical rate. A second sampling gate also controlled by the vertical rate signal samples a signal related to the output of the horizontal frequency synchronizing pulse generator at the vertical rate. A phase detector responsive to the output signal from each of the sampling gates develops an error signal indicative of the phase relationship between the two sampled signals. The error signal is utilized to control the phase of the generated horizontal synchronizing pulse.

DESCRIPTION OF A PREFERRED EMBODIMENT OF THE INVENTION

Figure 1:
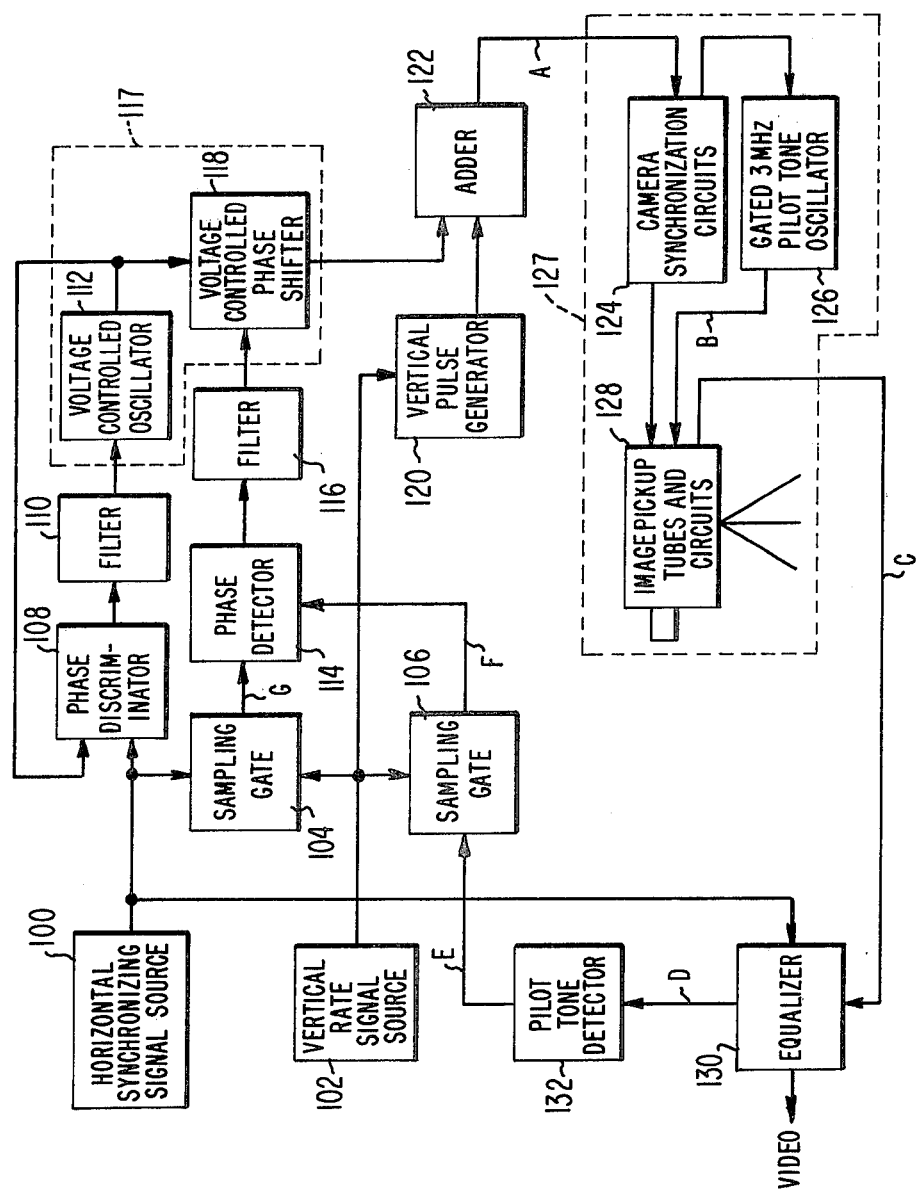
FIG. 1 is a block diagram of a phase locked loop system embodying the present invention.

Referring to FIG. 1, a source of horizontal synchronizing signals 100 and a source of vertical rate signals 102 are coupled to a first sampling gate 104. The sampling gate is controlled by the vertical rate signal to sample the horizontal synchronizing signal at the vertical rate. The output of a pilot tone detector 132 is coupled to a second sampling gate 106. The source of vertical rate signals 102 is also coupled to the second sampling gate 106 for sampling the output of the pilot tone detector at the vertical rate. The sampled horizontal synchronizing signal and the sampled detected pilot tone are coupled to a phase detector 114 via conductors G and F, respectively. The phase detector produces an error signal indicative of the phase relationship between the two sampled signals. This error signal is smoothed by filter 116 and applied to a voltage controlled phase shifter 118.

The voltage controlled phase shifter 118 and a voltage controlled oscillator 112 form a controllable horizontal synchronizing pulse generator 117. It is the output pulse from this generator that the error signal produced by the detector 114 must phase control. Therefore, it is possible to control the phase of this pulse by coupling the error signal to the voltage controlled oscillator, as an alternative to the coupling to the voltage controlled phase shifter shown in the preferred embodiment. In this alternative, the phase of the generated horizontal synchronization pulse is controlled at the oscillator, thus eliminating the need for a separate voltage controlled phase shifter.

The source of horizontal synchronizing signals 100 is also coupled to a phase locked loop comprising a phase discriminator 108, a filter 110, and a voltage controlled oscillator 112. The output of the voltage controlled oscillator and the horizontal synchronizing signal are applied to the phase discriminator 108. The output of the phase discriminator is smoothed by the filter and applied to the voltage controlled oscillator, thus forming a phase locked loop circuit in a known manner. This phase locked loop circuit synchronizes the output of the voltage controlled oscillator with the horizontal synchronizing signal.

If the output signal from the source of horizontal synchronizing signals 100 is of the appropriate waveform, the phase locked loop circuit including the phase discriminator 108, filter 110 and the voltage controlled oscillator 112 can be eliminated. In this alternative, the output of the source of horizontal synchronizing signals 100 is connected to the voltage controlled phase shifter 118 instead of to the phase discriminator 108, as shown in the preferred embodiment. In this alternative, the controllable horizontal synchronizing pulse generator 117 includes only the voltage controlled phase shifter 118.

In order to compensate for the phase delay introduced by the cable interconnecting the camera head and the camera control unit, the output of the voltage controlled oscillator 112 is coupled to the voltage controlled phase shifter 118. The control signal applied to the voltage controlled phase shifter through the filter 116 adjusts the phase shift of the output signal from the voltage controlled oscillator 112 before it is applied to the remainder of the camera system.

The output of the voltage controlled phase shifter is coupled to an adder circuit 122. The source of vertical rate signals 102 is coupled to a vertical pulse generator 120 which produces an encoded vertical synchronizing pulse. The output of the vertical pulse generator 120 is coupled to the adder circuit 122 to be combined with the horizontal rate output of the voltage controlled phase shifter to produce an encoded composite synchronizing signal. This synchronizing signal is coupled via a cable A to the camera synchronizing circuits 124.

The camera synchronizing circuits 124 decode the composite synchronizing signal into horizontal and vertical components. These horizontal and vertical components are utilized by the camera synchronization circuits in a known manner to produce those signals required in the camera head to scan an image and produce video signals representative of that image. The video signals produced by the camera head 127, which may include red, green, and blue-representative signals, are transmitted through a multi-conductor cable C to an equalizer circuit 130. The video signals representative of at least one color are combined with the output of a gated three megahertz (MHz) pilot tone oscillator 126. This oscillator is gated by a signal from the camera synchronizing circuits 124 to produce a squarewave signal with a signal swing which alternates between the black and white voltage levels for a period of five microseconds during the horizontal blanking interval of the video signal.

The source of horizontal synchronizing signals 100 is coupled to the equalizer circuit 130 for sampling the video signal which contains the gated pilot tone during the horizontal blanking interval. This sampled pilot tone signal is utilized by the equalizer to compensate for the high frequency roll-off of the video signal transmitted through the cable. The compensated video signals are coupled to other circuits (not shown) for further processing.

The video signal containing the gated pilot tone is coupled to the pilot tone detector 132. The pilot tone detector utilizes a comparator circuit to produce a pulse output whenever the signal exceeds a predetermined level. It will thus convert the first leading edge of the three megahertz pilot tone squarewave into the leading edge of an output pulse. However, it will also convert video signals of the proper amplitude into an output pulse. The output pulse is coupled to the second sampling gate 106 which only samples the information during a portion of the vertical blanking intervals, when no video signals exist. Thus, erroneous pulses produced by the pilot tone detector in response to video signals exceeding the predetermined level are excluded.

In operation, the output of the source of horizontal synchronizing signals 100 is sampled for a portion of the vertical blanking interval by the sampling gate 104 under the control of the vertical rate signal from source 102. A sample of the output of the pilot tone detector 132 is simultaneously taken.

Figure 2A:
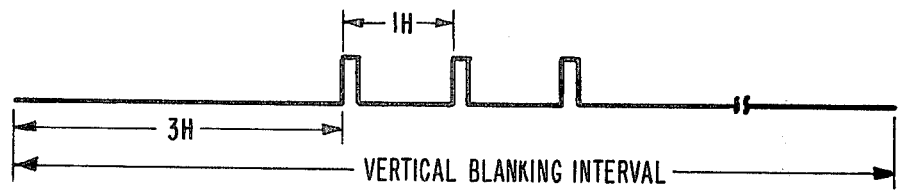
FIGS. 2A, 2B, 3, 4, 5A, and 5B illustrate, on respective time scales, voltage waveforms obtained in the system of FIG. 1.

FIG. 2A illustrates a sample of three pulses taken during the fourth through the seventh horizontal intervals during the vertical blanking interval, in which the letter H designates the period of one horizontal line and the number preceding it designates the number of such periods. The number of pulses within the sample and the timing of the sample within the vertical blanking interval are not critical and are chosen to be consistent with other functions performed during this interval. The number of pulses should be the same, however, in the samples of both the horizontal synchronizing pulse generator output and the detected pilot tone.

These samples are each fed to respective inputs of phase detector 114. Phase detector 114 is an edge-controlled memory network which operates on the leading edges of the two signals. The output of the phase detector is a 3-state output. This output may assume either a logic "1" or a logic "0" or a high impedance state.

If the signal on conductor F (FIG. 1) is higher in frequency than the signal on conductor G, then the output of the detector will be a logic "1" continuously, except when the two signals exactly match in phase. In the latter condition, the output will be the high impedance state. Similarly, if the signal on conductor F is lower in frequency than the signal on conductor G, then the output of the detector will be a logic "0" continuously, except when the two signals exactly match in phase, when it will be the high impedance state.

If the two signals are of the same frequency but the signal on conductor F lags the signal on conductor G, the output of the detector will be a logic "0" for a time equal to the phase difference. Similarly, if the signal on conductor F leads the signal on conductor G, then the detector output will be a logic "1" for a time equal to the phase difference.

The output of the phase detector is coupled to a low pass filter 116; which may include, for example, a capacitor coupled in series with a resistor between the output of the phase detector and ground. This capacitor is discharged or charged by the logic "0" or logic "1" states of the output signal from the phase detector. The DC level across this capacitor is fed to a voltage controlled phase shifter 118.

The output of the source of horizontal synchronizing signals 100 is also fed to an input of phase discriminator 108. The output signal from the voltage controlled oscillator 112 is supplied to the input of the phase discriminator. This phase discriminator, which may be of any well-known type, produces an error voltage which is indicative of the phase error between the output of the voltage controlled oscillator and the horizontal synchronizing signal. This error voltage is filtered by filter 110 and applied to voltage controlled oscillator 112, to synchronize the oscillator with the source of horizontal synchronizing signals in a known manner.

The output of the voltage controlled oscillator may be, for example, a triangular wave which is fed to the input of the voltage controlled phase shifter 118. The voltage controlled phase shifter comprises a comparator which compares the DC voltage from phase detector 114 through filter 116 with the triangular wave produced by the voltage controlled oscillator. When the triangular wave crosses the DC level of the error voltage the comparator produces a trigger voltage to produce a horizontal synchronizing pulse in a known manner. This synchronizing pulse is coupled to adder 122.

Figure 3:
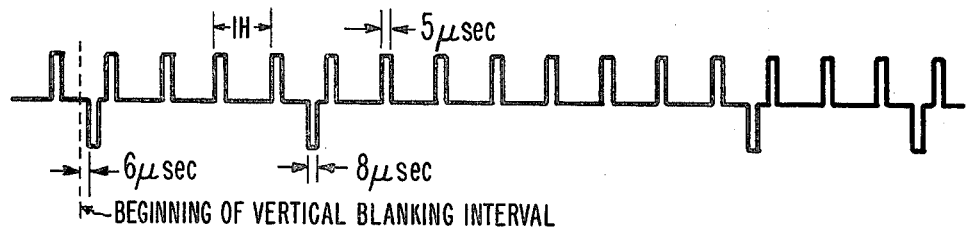

The output from the source of vertical rate signals 102 is utilized to trigger a vertical pulse generator 120. This pulse generator produces a series of four timing pulses of negative polarity during the vertical blanking intervals. These pulses are timed so that they do not coincide with the horizontal synchronizing pulses. The horizontal synchronizing pulses fed to the adder circuit are of a positive polarity. These two signals are summed by the adder circuit 122 to produce a composite synchronizing signal, shown in FIG. 3, which is fed via the cable A to the camera synchronizing circuits which are located at a remote location in the camera head.

Figure 4:
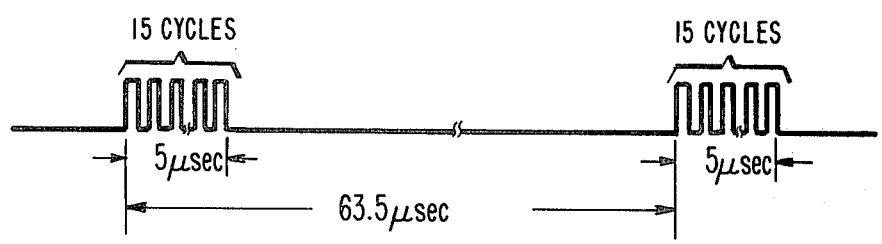
Figure 5A:
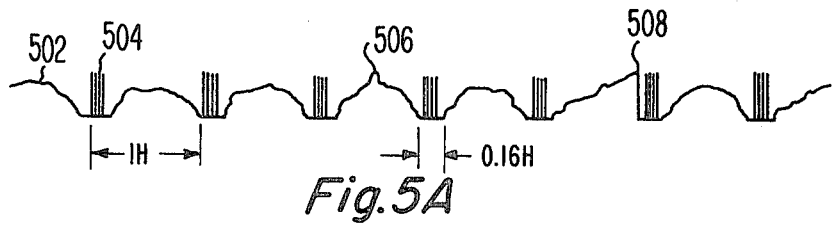

The camera synchronization circuits generate those signals necessary to scan an image and produce video signals representative of that image. These include, for example, the horizontal drive, horizontal target blanking, and horizontal video blanking signals as well as the vertical drive, vertical target blanking, and vertical video blanking signals. In addition, these circuits produce a gating signal during each horizontal blanking interval to gate on the three megahertz pilot tone oscillator. The output of the gated three megahertz pilot tone oscillator 126 is coupled via conductor B to the image pickup circuits 128 where it is combined with the video output of at least one of the image pickup tubes. This gated three megahertz pilot tone signal, shown in FIG. 4, consists of 15 cycles of a three megahertz squarewave and occupies a period of five microseconds during a horizontal blanking interval. Its amplitude level alternates between the white and black voltage levels of the video signal. The combined signal as illustrated by FIG. 5A, in which the wave form portion 502 is the video component and the portion 504 is the pilot tone component, is coupled via a cable C to an equalizer which is located in the camera control unit. The cable C and the cable A each interconnect the camera head and the camera control unit and will thus be approximately the same length.

The equalizer circuit samples the incoming video signals from at least one of the image pickup tubes under the control of the horizontal synchronizing signal from the source 100. This sampling separates the gated three megahertz pilot tone which was inserted into the video signal during the horizontal blanking interval at the camera head, from the composite signals. The attenuation of the three megahertz signal in the interconnecting cable between the camera head and the equalizer is representative of the attenuation of the high frequency video components. In view of the fact that the pilot tone is a squarewave signal which alternates between white and black voltage levels it can be utilized by conventional circuits to alter the gain through the equalizer of the high frequency components of the video signals. This altered gain will automatically compensate for the high frequency losses in the cable and restore the signals to the level transmitted by the camera head.

The equalizer also feeds the video signal containing the gated three megahertz pilot tone to the pilot tone detector via conductor D. The take-off point for this signal is after a fixed gain high frequency peaking amplifier in order to guarantee adequate signal for the pilot tone detector. The take-off point is not at the video output of the equalizer because until the horizontal synchronizing pulse phase locked loop has locked the generation of the horizontal synchronizing pulse into synchronization with the source 100, the samples taken by the equalizer circuit will be erroneous and will result in improper compensation. This erroneous sampling does not adversly affect the operation of the camera, as the horizontal synchronizing pulse phase locked loop will normally lock in phase with the source 100 within two seconds, whereas the image pickup tubes in the camera head will not produce usable video signals for approximately 30 seconds after initial turn-on.

The output of the high frequency peaking amplifier stages is fed into a comparator in the pilot tone detector having positive feedback. When the signal crosses the predetermined threshold of the comparator, the positive feedback will cause the comparator to produce a pulse having a width of approximately five microseconds. Thus, the comparator will respond to the leading edge of the first squarewave of the pilot tone signal to produce a five microsecond pulse; which results in the comparator being nonresponsive to the remainder of the pilot tone signal.

Figure 5B:
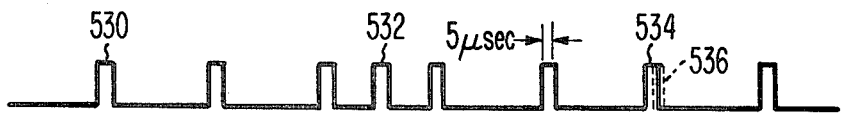

However, this generates a problem which is solved by the present invention. The comparator circuit in the pilot tone detector will respond to peak video signals which are of the same amplitude as the pilot tone signal and generate output pulses of five microseconds duration. It is possible that the video signal will reach the trigger level of the comparator just prior to the beginning of the horizontal blanking interval. This would produce a pulse the duration of which would extend into the horizontal blanking interval. If the prior art sampling techniques were utilized and the signal sampled during each horizontal blanking interval, then erroneous operation could result. FIG. 5B shows the output of the pilot tone detector having erroneous pulses 532 and 534. These erroneous pulses are the result of peaks 506 and 508, respectively, in the video signal of FIG. 5A. It should be noted that the pulse 534 extends into the horizontal blanking interval 536 which is shown in phantom in FIG. 5B.

Although it is theoretically possible to avoid this problem by inserting the three megahertz pilot tone signal during the last five microseconds of the approximately 10 microsecond horizontal blanking interval, this creates a critical timing situation. If the video signal just prior to the horizontal blanking interval were of sufficient magnitude to trigger the comparator, as shown in waveform 508 in FIG. 5A, to produce a pulse, then the trailing edge of the generated five microsecond pulse would occur very close in time to the leading edge of the pulse produced in response to the leading edge of the pilot tone signal. This would make the timing of the sampling pulse very critical and would require a comparator in the pilot tone detector which has a very rapid settling time.

This problem is further compounded by the uncertainty in the delay time introduced by the unknown cable length. The total delay in the system is the sum of that introduced by the two approximately equal length cables A and C (FIG. 1). At a typical delay of 1.5 nanoseconds per foot of cable, a system allowing for a separation between the camera control unit and the camera head of 2,000 feet, must compensate for a phase delay of six microseconds. The total time required by this system exceeds the length of the horizontal blanking interval.

Figure 2B:
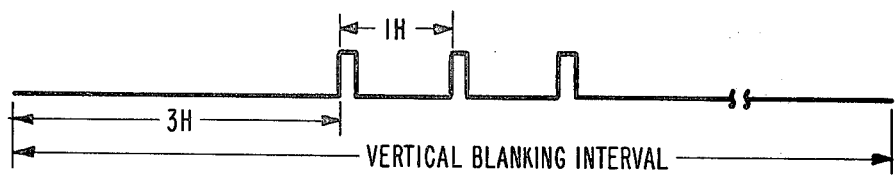

The present invention solves this problem by coupling the output of the pilot tone detector via conductor E to a sampling gate 106. This sampling gate is controlled by the vertical rate signal from source 102 to sample the output of the pilot tone detector at the vertical rate. The sampling interval utilized to sample the horizontal syncronizing pulse generator is shown in FIG. 2B. By sampling during a portion of the vertical blanking interval, the sample can be taken when there are no video signals present either before or after the desired pulse. In this manner, a pulse free of extraneous signals can be obtained. It should be noted that extraneous pulses such as 532 and 534 of FIG. 5B are not present in FIG. 2B. The pulse train shown in FIG. 5B is coupled to the phase detector 114 via conductor F, thus closing the loop.

What is claimed is:

1. A phase lock loop circuit for a television system for reducing the phase difference between a generated horizontal synchronizing pulse and a reference signal, said circuit comprising:
    a controllable horizontal synchronizing pulse generator;
    a source of horizontal frequency reference signals;
    a source of the vertical rate signals;
    first sampling means coupled to said horizontal reference source and to said vertical rate signal source for sampling said horizontal reference signals at the vertical rate;
    second sampling means coupled to said source of vertical rate signals and to the output of said controllable horizontal synchronizing pulse generator for sampling said output signal at the vertical rate; and
    a phase detector coupled to said first and second sampling means for generating an error signal, said error signal being coupled to said controllable horizontal synchronizing pulse generator for controlling the phase of said horizontal synchronizing pulses.

2. The circuit according to claim 1 wherein said horizontal synchronizing pulse generator includes a voltage controlled oscillator coupled to a voltage controlled phase shifter.

3. The circuit according to claim 1 wherein said first and said second sampling means are operative to sample said horizontal frequency reference signals and said output signal, respectively, during the vertical blanking interval.

4. The circuit according to claim 3 wherein said sampling occurs within certain horizontal blanking intervals within said vertical blanking interval.

5. In a television camera system having a camera head and a camera control unit interconnected by a cable, a phase lock loop circuit for compensating for the phase delay in said cable of horizontal synchronizing pulses generated in said camera control unit and coupled to said camera head, said circuit comprising:
    a controllable horizontal synchronizing pulse generator, the output of said generator being coupled to said camera head;
    a source of horizontal reference signals;
    a source of vertical rate reference signals;
    first sampling means coupled to said horizontal reference source and to said vertical rate signal source for sampling said horizontal reference signals at the vertical rate;
    second sampling means coupled to said source of vertical rate signals and to the output of said horizontal synchronizing pulse generator via said cable for sampling said output signal at the vertical rate; and
    a phase detector coupled to said first and second sampling means for generating an error signal, said error signal being coupled to said controllable horizontal synchronizing pulse generator for controlling the phase of said horizontal synchronizing pulses to compensate for the phase delay of said cable.

* * * * *